United States Patent
Yin et al.

(10) Patent No.: US 10,353,683 B2
(45) Date of Patent: Jul. 16, 2019

(54) DYNAMICALLY CALCULATING AND APPLYING A TIMEOUT VALUE TO A MANUFACTURER UPDATE SERVICE

(75) Inventors: Jianwen Yin, Round Rock, TX (US); Yong Cao, Cedar Park, TX (US); Xianghong Qian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1958 days.

(21) Appl. No.: 12/418,336

(22) Filed: Apr. 3, 2009

(65) Prior Publication Data

US 2010/0257525 A1 Oct. 7, 2010

(51) Int. Cl.
*G06F 8/60* (2018.01)

(52) U.S. Cl.
CPC ..................... *G06F 8/60* (2013.01)

(58) Field of Classification Search
None
See application file for complete search history.

(56) References Cited

U.S. PATENT DOCUMENTS

| | | | |
|---|---|---|---|
| 6,526,433 B1 * | 2/2003 | Chang et al. | 709/201 |
| 7,003,617 B2 | 2/2006 | Golasky et al. | |
| 7,461,374 B1 * | 12/2008 | Balint | G06F 8/68 717/135 |
| 7,953,870 B1 * | 5/2011 | Reeves et al. | 709/228 |
| 2008/0134347 A1 * | 6/2008 | Goyal | G06F 21/6209 726/29 |
| 2008/0155533 A1 | 6/2008 | Mittapalli et al. | |
| 2008/0244302 A1 | 10/2008 | Khatri et al. | |

OTHER PUBLICATIONS

Seroter, Richard. "Avoiding Service Timeouts in High Volume Orchestration Scenarios". Jul. 13, 2007. 2 pages. Obtained via: http://seroter.wordpress.com/2007/07/13/avoiding-service-timeouts-in-high-volume-orchestration-scenarios/.*
Shen, John Paul. Lipasti, Mikko. "Modern Processor Design: Fundamentals of Superscalar Processors", McGraw Hill, 2005. pp. 456-457.*

* cited by examiner

*Primary Examiner* — George Giroux
(74) *Attorney, Agent, or Firm* — Terrile, Cannatti & Chambers; Stephen A. Terrile

(57) ABSTRACT

A system for dynamically generating a timeout value based on a customer runtime environment for use with a manufacturer update package. More specifically, the system for dynamically generating a timeout value decomposes calculation of a timeout value based upon the major steps contained within the update service and dynamically calculates the timeout value based upon processor load. In certain embodiments the system uses a heuristic algorithm to perform the calculation.

10 Claims, 4 Drawing Sheets

```
<Plugin type="0" description="Inventory" timeout="300">
    <Startfile>deviceie.exe</Startfile>
    ...
</Plugin>
<Plugin type="1" description="Execution" timeout="600">
    <Startfile>device.exe</Startfile>
    ...
</Plugin>
```

*Figure 3*

DYNAMICALLY CALCULATING AND APPLYING A TIMEOUT VALUE TO A MANUFACTURER UPDATE SERVICE

BACKGROUND OF THE INVENTION

Field of the Invention

The present invention relates to information handling systems and more particularly to dynamically calculating and applying a timeout value to a manufacturer update service for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An issue for information handling systems relates to managing updates to software on the information handling system. This issue is especially important when the software is system software for the information handling system. System software includes the basic input output system (BIOS), other firmware and device drivers. System software is often embedded within the hardware of the information handing system and provides an interface between the hardware of the information handling system and higher level computer programs. Updates to the software can include error (i.e., bug) fixes as well as feature enhancements to extend the functionality of the software. Managing updates to the system software is often an important part of an information technology administrator within an organization employing multiple information handling systems.

Accordingly, a known information handling system supplier provides information handling systems with an manufacturer update package. The manufacturer update package creates a system inventory to report operating system information, target system configuration information, device specific information and version information; performs a comparison between installed system software attributes and a payload of the manufacturer update package to determine applicability of the manufacturer update package; and, executes the update package to apply the payload to update the system software.

However the known manufacturer update package has a number of issues. For example, components of the manufacturer update package architecture are divided into a framework as well as a device inventory and execution (IE) plug-in module. With this arrangement, anything that is device specific, such as how to perform inventory collection and apply the payload to a specific device is part of the device plug-ins. The device plug-ins are implemented on a per device basis. The framework interfaces with the inventory and execution plug-ins via a command line interface (CLI) and an XML data representation. The framework executes the device inventory and execution to perform either inventory collection or update based on the CLI of the inventory that is defined in a file (e.g., a IEConfig.xml file). In the case that execution of the IE modules falls into a dead block, current design of the file will have a timeout value that is hard coded so that the framework process will terminate the child process which launches the IE module so that the update package can exit gracefully.

In the known update package, hard coding a timeout value from each device file is based on anecdotal experience of how long the inventory collection module or execution module will take to execute. The timeout value should not be too long as then the customer has to wait unnecessarily longer to perform a system software update using the update package. However, the preset timeout value may not be long enough to complete the update operation, in which case the update package framework will terminate the IE module based upon a timeout condition and return an error of inventory or update fail.

Accordingly, it would be desirable to provide an update package with an ability to dynamically generate a timeout value based on a customer runtime environment.

SUMMARY OF THE INVENTION

In accordance with the present invention, a system for dynamically generating a timeout value based on a customer runtime environment for use with a manufacturer update package is set forth. More specifically, the system for dynamically generating a timeout value decomposes calculation of a timeout value based upon the major steps contained within the update service and dynamically calculates the timeout value based upon processor load. In certain embodiments the system uses a heuristic algorithm to perform the calculation.

In certain embodiments, the system for dynamically generating a timeout value identifies three major steps of an update service as an inventory collection step, a payload comparison step and an update execution step. These steps are generally performed in order and are not performed in parallel.

More specifically, in one embodiment, the invention relates to a method for dynamically generating a timeout value based on a customer runtime environment for use with a manufacturer update package. The method includes decomposing calculation of a timeout value based upon a plurality of major steps contained within an update service; and, dynamically calculating the timeout value based upon processor load.

In another embodiment, the invention relates to an apparatus for dynamically generating a timeout value based on a customer runtime environment for use with a manufacturer update package. The apparatus includes means for decomposing calculation of a timeout value based upon a plurality of major steps contained within an update service; and, means for dynamically calculating the timeout value based upon processor load.

In another embodiment, the invention relates to an information handling system comprising a processor and memory coupled to the processor. The memory stores a system for dynamically generating a timeout value based on a customer runtime environment for use with a manufacturer update package. The system comprises instructions executable by the processor for decomposing calculation of a timeout value based upon a plurality of major steps contained within an update service; and, dynamically calculating the timeout value based upon processor load.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows an example PIEConfig.xml file.

DETAILED DESCRIPTION

Figure 1:
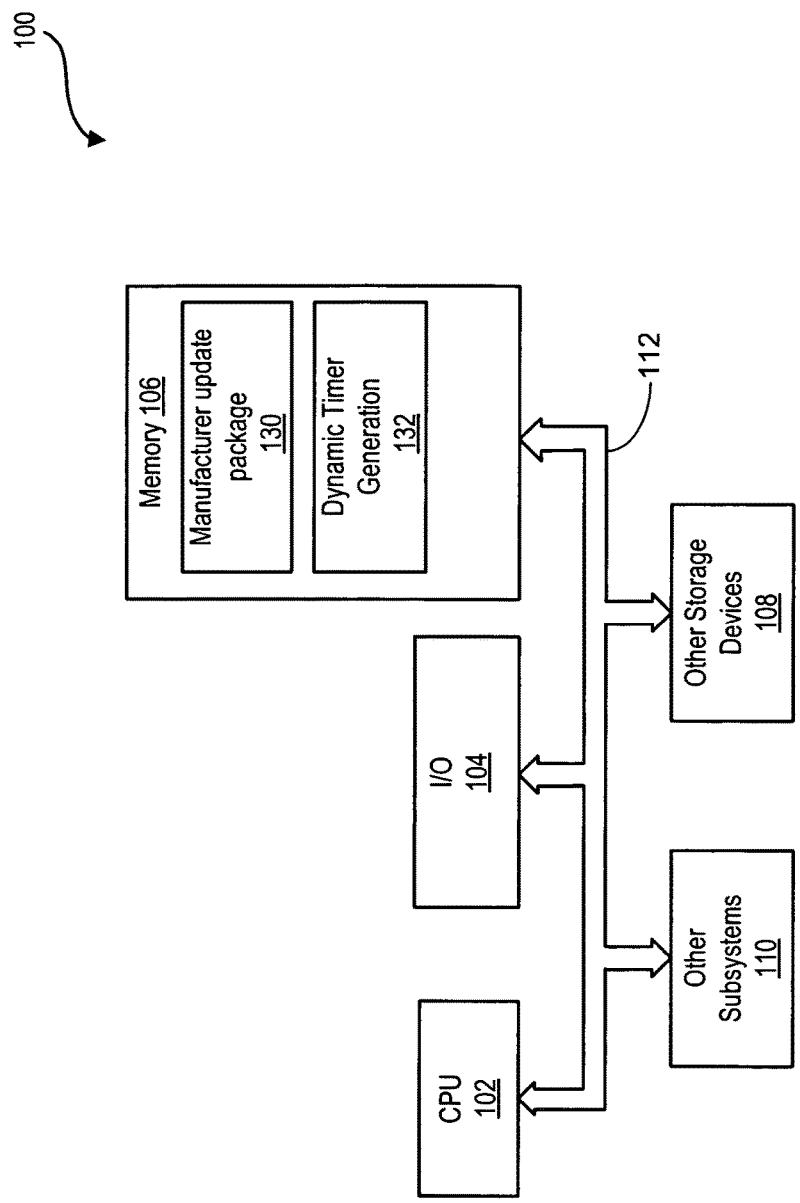
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The memory stores a manufacturer update package system 130 which includes a dynamic timer generation system 132.

The dynamic timer generation system 132 dynamically generates a timeout value based on a customer runtime environment for use with the manufacturer update package system 130. More specifically, the dynamic timer generation system 132 decomposes calculation of a timeout value based upon the major steps contained within an update service and dynamically calculates the timeout value based upon processor load. In certain embodiments the system uses a heuristic algorithm to perform the calculation. The dynamic timer generation system generates a timeout value by identifying three major steps of an update service as an inventory collection step, a payload comparison step and an update execution step. These steps are generally performed in order and are not performed in parallel.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
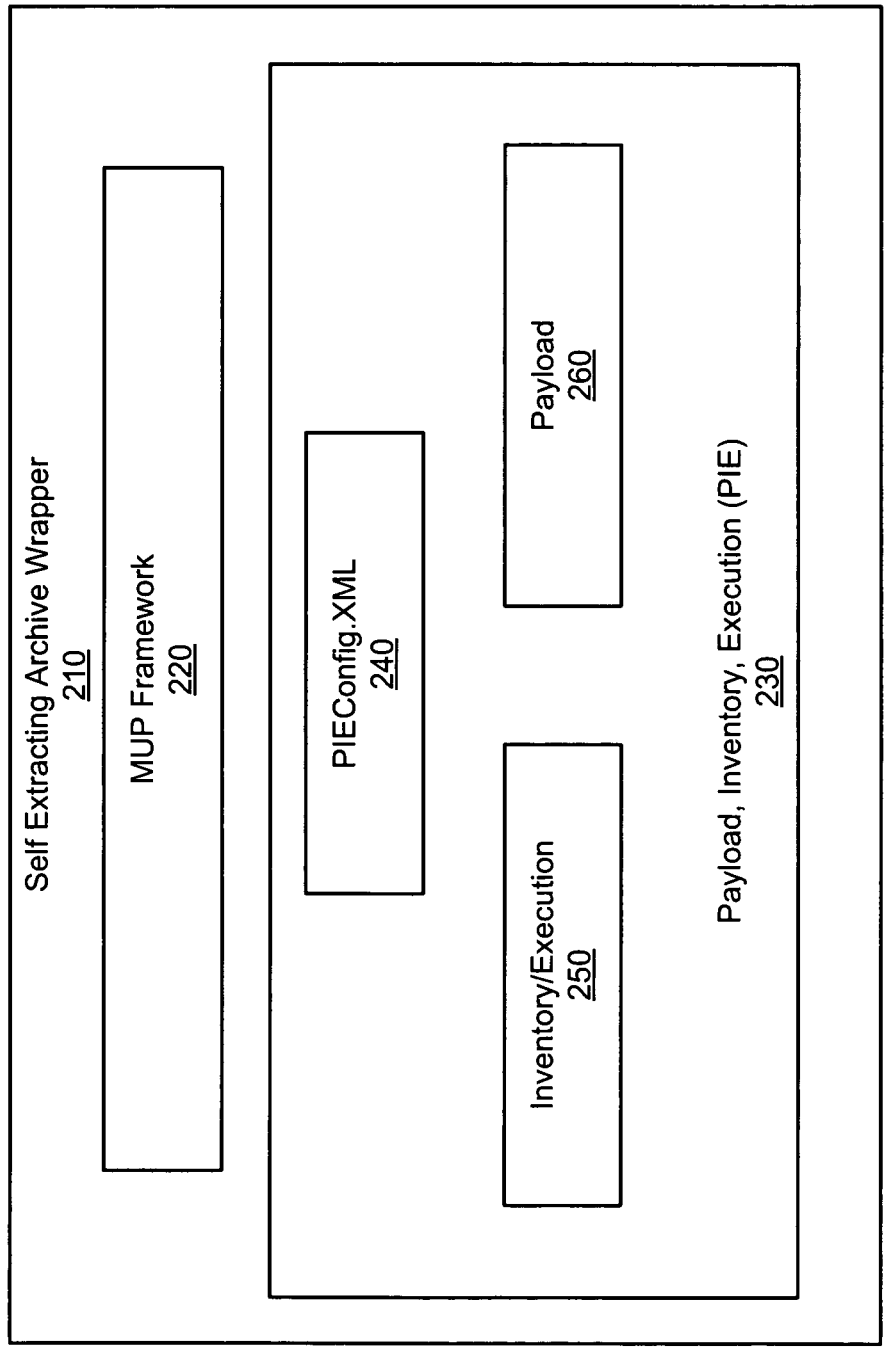
FIG. 2 shows a block diagram of a self extracting archive wrapper.

Referring to FIG. 2, a block diagram of a self extracting archive wrapper is shown. More specifically, the self extracting archive wrapper 210 includes a manufacturer update package framework module 220 as well as a payload, inventory and execution module 230. The payload, inventory and execution module 230 includes a payload, inventory, execution (PIE) configuration file 240 (e.g., PIEConfig.xml) as well as an inventory/execution (IE) module 250 and a payload module 260.

Referring to FIG. 3, an example PIE configuration file is shown. More specifically, the PIE configuration file (PIEConfig.xml) is an xml type data file that rather than representing a type, name and a hard coded timeout (as in known systems), represents a type, name and expected time to execute a component. This expected time is then used to dynamically calculate the timeout.

Figure 4:
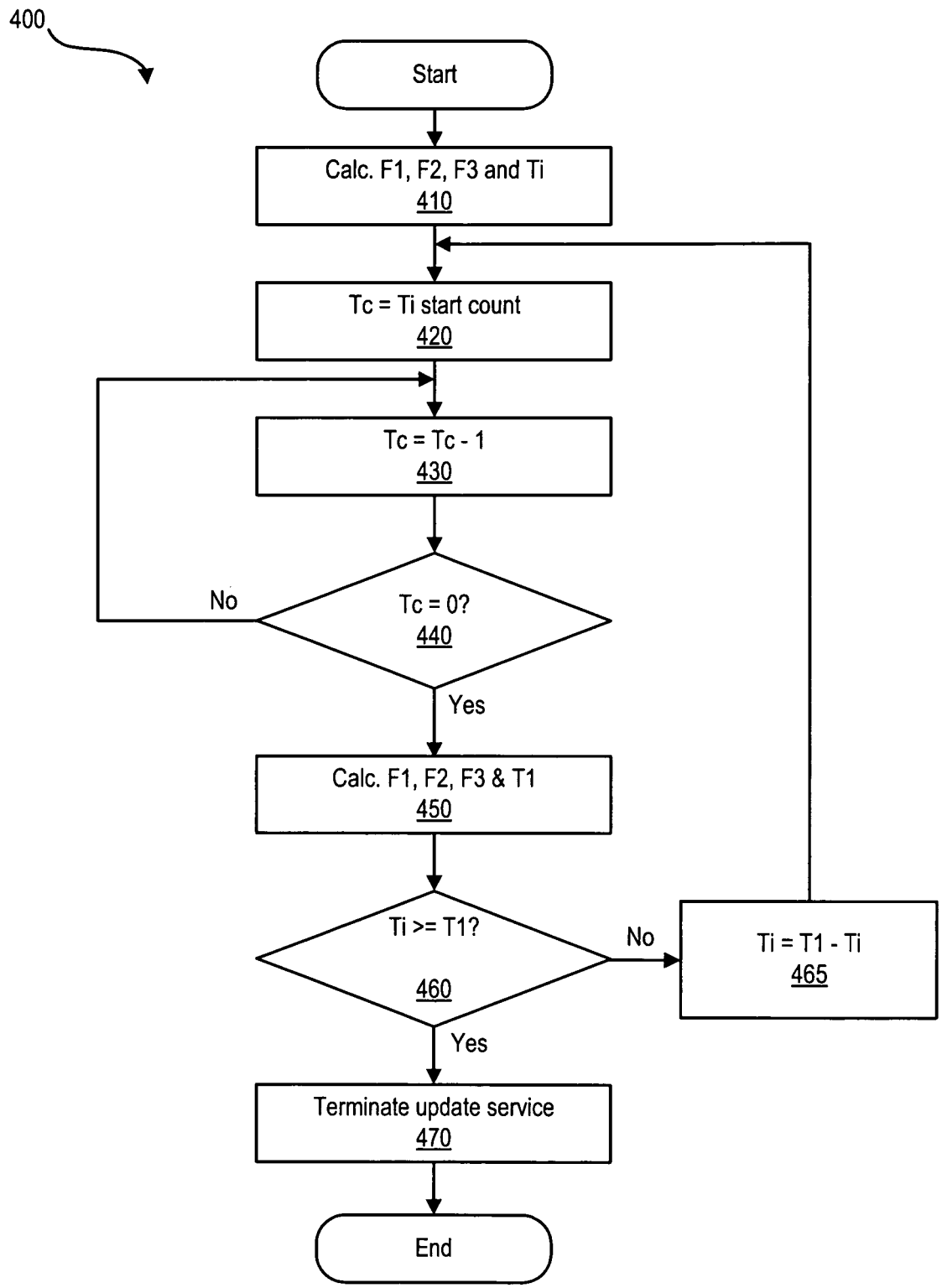
FIG. 4 shows a flow chart of the operation of a system for dynamically generating a timeout value.

FIG. 4 shows a flow chart of the operation of a system for dynamically generating a timeout value 400. More specifically, the system for dynamically generating a timeout value 400 performs a plurality of calculations at step 410. These calculations include generation of a first function value (F1), generation of a second function value (F2), generation of a third function value (F3) and generation of a time value (T1).

The first function value is calculated as $$F1(IC)=\text{Sum}(Tmodi)/\text{Max}(0.1,(IdleRate+ICRate)),$$
where F1(IC) is an expected time to be spend for inventory collection;

Tmodi is an expected time for the module I to perform an inventory collection;

IdleRate is a system idle process processor usage rate; and,

ICRate is an inventory collector processor usage rate.

The second function value is calculated as $$F2(MPC)=\text{Sum}(MPC\text{modi})/\text{Max}(0.1,(IdleRate+MPCRate)), \text{ where}$$

F2(MPC) is an expected time to be spent for a MUP payload comparison;

MPCModi is an expected time for module 1 to perform a payload comparison;

Idle rate is an inventory collector processor usage rate; and,

MPCRate is an MUP module processor usage rate.

The third function value is calculated as $$F3(EU)=\text{Sum}(TEU\text{modi})/\text{Max}(0.1,(IdleRate+EURate)), \text{ where}$$

F3(EU) is a time spend for executing the update;

TEUmodi is an expected time for module 1 to perform an update;

IdleRate is an inventory collector processor usage rate; and,

EURate is an executing update module processor usage rate.

The time value is calculated as $$Ti=F1(IC)+F2(MPC)+F3(EU).$$

Next at step 420, the system determines whether to start counting down. The system makes this determination when the time value Tc equals the time value Ti. Next at step 430, the time value Tc is set equal to Tc−1. Next at step 440, the system determines whether the time value Tc=0. If the value of Tc does not equal zero, then the system returns to perform step 430.

If the value Tc does equal zero, then the system proceeds to calculation step 450, where the function values F1, F2 and F3 and the time value T1 are again calculated. Next, the system proceeds to determine whether the time value Ti is greater than or equal to the time value T1 at step 460. If the value Ti is not greater than or equal to the time value Ti, then the system sets the value Ti equal to the difference between the time value t1 and the time value Ti at step 465 and then performs step 420. If the value of Ti is greater than or equal to the value of T1, then the system terminates the update service at step 470 and completes operation.

The system calculates the value Ti twice because the first time Ti is calculated (such as the timeout time when the system starts executing), the time value Ti is calculated based on the status of the processor (e.g., how busy the processor is) when the update starts. Once the time value Ti counts down the zero, the timeout time is recalculated based on the processor status as well as a captured T1 value. Thus, if the processor is busier, the timeout value is recalculated because the processor may require more time to complete the update. Such a system avoids one of the issues of prior art systems where a busier processor could cause a timeout condition to occur simply because the processor was too busy to complete the timeout in the preset timeout time.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for dynamically generating a timeout value based on a customer runtime environment for use with a manufacturer update package comprising:
    decomposing calculation of a timeout value based upon a plurality of major steps contained within an update service contained within a self-extracting archive wrapper, the major steps of the update service comprising an inventory collection step, a payload comparison step and an update execution step, the self-extracting archive wrapper comprising a payload, inventory and execution module, the payload, inventory and execution module comprising a payload, inventory, execution configuration file, the payload, inventory, execution configuration file comprising an entry representing a type, name and expected time to execute a component of the manufacturer update package; and,
    dynamically calculating the timeout value for use with the manufacturer update package based upon processor load; and,
    using a heuristic algorithm to perform the dynamically calculating; and wherein
    the dynamically calculating further comprises calculating a first function value, a second function value, a third function value and a time value, the time value being based upon the first function value, the second function value and the third function value;
    the first function value comprises an expected time to perform inventory collection, the second function value comprises an expected time to perform a payload comparison and the third function value comprises an expected time for executing an update operation; and,
    the time value is calculated twice when calculating the timeout value, the time value being first calculated based on a processor status when the update service begins operation and being recalculated when the time value counts down to zero, recalculation of the time value being based upon the processor status so as to determine whether the processor requires more time to complete the update service.

2. The method of claim 1 wherein:
    the major steps are performed in order and are not performed in parallel.

3. The method of claim 1 wherein:
    the expected time to perform inventory collection is calculated based upon a sum of expected times to perform inventory collections, a system idle process processor usage rate and an inventory collector processor usage rate.

4. The method of claim 1 wherein:
    the expected time to perform the payload comparison is calculated based upon a sum of expected times to perform payload comparison, a payload processor usage rate and a system idle process processor usage rate.

5. The method of claim 1 wherein:
    the expected time for executing an update operation is calculated based upon a sum of expected times to perform an update, an update module processor usage rate and a system idle process processor usage rate.

6. An apparatus for dynamically generating a timeout value based on a customer runtime environment for use with a manufacturer update package comprising:
   means for decomposing calculation of a timeout value based upon a plurality of major steps contained within an update service contained within a self-extracting archive wrapper, the major steps of the update service comprising an inventory collection step, a payload comparison step and an update execution step, the self-extracting archive wrapper comprising a payload, inventory and execution module, the payload, inventory and execution module comprising a payload, inventory, execution configuration file, the payload, inventory, execution configuration file comprising an entry representing a type, name and expected time to execute a component of the manufacturer update package;
   means for dynamically calculating the timeout value for use with the manufacturer update package based upon processor load; and,
   means for using a heuristic algorithm to perform the dynamically calculating; and wherein
   the dynamically calculating further comprises calculating a first function value, a second function value, a third function value and a time value, the time value being based upon the first function value, the second function value and the third function value;
   the first function value comprises an expected time to perform inventory collection, the second function value comprises an expected time to perform a payload comparison and the third function value comprises an expected time for executing an update operation; and,
   the time value is calculated twice when calculating the timeout value, the time value being first calculated based on a processor status when the update service begins operation and being recalculated when the time value counts down to zero, recalculation of the time value being based upon the processor status so as to determine whether the processor requires more time to complete the update service.

7. The apparatus of claim 6 wherein:
   the major steps are performed in order and are not performed in parallel.

8. An information handling system comprising:
   a processor;
   memory coupled to the processor, the memory storing a system for dynamically generating a timeout value based on a customer runtime environment for use with a manufacturer update package, the system comprising instructions executable by the processor for:
      decomposing calculation of a timeout value based upon a plurality of major steps contained within an update service contained within a self-extracting archive wrapper, the major steps of the update service comprising an inventory collection step, a payload comparison step and an update execution step, the self-extracting archive wrapper comprising a payload, inventory and execution module, the payload, inventory and execution module comprising a payload, inventory, execution configuration file, the payload, inventory, execution configuration file comprising an entry representing a type, name and expected time to execute a component of the manufacturer update package; and,
      dynamically calculating the timeout value for use with the manufacturer update package based upon processor load; and,
      using a heuristic algorithm to perform the dynamically calculating; and wherein
   the dynamically calculating further comprises calculating a first function value, a second function value, a third function value and a time value, the time value being based upon the first function value, the second function value and the third function value;
   the first function value comprises an expected time to perform inventory collection, the second function value comprises an expected time to perform a payload comparison and the third function value comprises an expected time for executing an update operation; and,
   the time value is calculated twice when calculating the timeout value, the time value being first calculated based on a processor status when the update service begins operation and being recalculated when the time value counts down to zero, recalculation of the time value being based upon the processor status so as to determine whether the processor requires more time to complete the update service.

9. The information handling system of claim 8 wherein:
   the major steps are performed in order and are not performed in parallel.

10. A method for dynamically generating a timeout value based on a customer runtime environment for use with a manufacturer update package comprising:
   decomposing calculation of a timeout value based upon a plurality of major steps contained within an update service contained within a self-extracting archive wrapper, the major steps of the update service comprising an inventory collection step, a payload comparison step and an update execution step, the self-extracting archive wrapper comprising a payload, inventory and execution module, the payload, inventory and execution module comprising a payload, inventory, execution configuration file, the payload, inventory, execution configuration file comprising an entry representing a type, name and expected time to execute a component of the manufacturer update package; and,
   dynamically calculating the timeout value for use with the manufacturer update package based upon processor load; and wherein
   the dynamically calculating further comprises calculating a first function value, a second function value, a third function value and a time value, the time value being based upon the first function value, the second function value and the third function value;
   the first function value comprises an expected time to perform inventory collection, the second function value comprises an expected time to perform a payload comparison and the third function value comprises an expected time for executing an update operation;
   the time value is calculated twice when calculating the timeout value, the time value being first calculated based on a processor status when the update service begins operation and being recalculated when the time value counts down to zero, recalculation of the time value being based upon the processor status so as to determine whether the processor requires more time to complete the update service;
   the expected time to perform inventory collection is calculated based upon a sum of expected times to perform inventory collections, a system idle process processor usage rate and an inventory collector processor usage rate;
   the expected time to perform the payload comparison is calculated based upon a sum of expected times to perform payload comparisons, a payload processor usage rate and a system idle process processor usage rate; and, the expected time for executing an update operation is calculated based upon a sum of expected times to perform an update, an update module processor usage rate and a system idle process processor usage rate.

\* \* \* \* \*